ANGULAR MOTION RESPONSIVE APPARATUS AND METHOD UTILIZING OPTICALLY ALIGNABLE MAGNETIC MOMENTS

Filed Feb. 12, 1960 5 Sheets-Sheet 1

INVENTOR.
JOHN MILTON ANDRES
BY Albert Rosen
ATTORNEY

INVENTOR.
JOHN MILTON ANDRES
BY Albert Rosen
ATTORNEY

INVENTOR.
JOHN MILTON ANDRES
BY Albert Rosen
ATTORNEY

INVENTOR.
JOHN MILTON ANDRES
BY Albert Rosen
ATTORNEY

Nov. 17, 1964 J. M. ANDRES 3,157,837

ANGULAR MOTION RESPONSIVE APPARATUS AND METHOD UTILIZING OPTICALLY ALIGNABLE MAGNETIC MOMENTS

Filed Feb. 12, 1960 5 Sheets-Sheet 5

INVENTOR.
JOHN MILTON ANDRES
BY Albert Rosen
ATTORNEY

United States Patent Office 3,157,837

Patented Nov. 17, 1964

3,157,837
ANGULAR MOTION RESPONSIVE APPARATUS AND METHOD UTILIZING OPTICALLY ALIGNABLE MAGNETIC MOMENTS

John Milton Andres, Rolling Hills Estates, Calif., assignor to Space Technology Laboratories, Inc., Los Angeles, Calif., a corporation of Delaware Filed Feb. 12, 1960, Ser. No. 8,453
12 Claims. (Cl. 324—.5)

This invention relates generally to the gyroscopic control art and more particularly to improvements in those control or guidance devices that sense angular rotation of a body by utilization of the gyromagnetic properties of atoms or elementary particles.

Gyroscopic devices are known that utilize the gyromagnetic properties of atoms or elementary particles as part of a system to sense angular rotation of a body and provide an output guidance control signal. In such devices it is often necessary that the particles be in a particular, preferred orientation with respect to the axis of body rotation in order to maximize the output signal: the output signal being proportional to the angular rotation of the body. This preferred particle orientation is usually achieved by means of a static magnetic field. An oscillating magnetic field is also applied to the particles causing a precessional motion of the particles which is usually detected by the use of an induction coil pickup.

Such systems have not proven entirely satisfactory. For example, the strength of the static magnetic field must be maintained within a very narrow tolerance, and the use of an induction coil pickup introduces noise into the detection system which prohibits the detection of relatively small angular rotations.

It is an object of this invention to provide a gyroscopic arrangement of the type utilizing the gyromagnetic properties of atoms or elementary particles with improved means for achieving a preferred orientation of the particles and improved means for detecting an output signal proportional to the angular rotation of a body.

It is a further object of this invention to provide a gyroscopic device of the kind referred to, in which the paricular energy required for achieving the preferred orientation of the particles is easily and automatically obtained and maintained and wherein the detection system is substantially free of noise.

This invention overcomes the above-described difficulties by using a beam of light together with a magnetic field to effect a preferred orientation of the optically alignable magnetic moments of a magnetic field responsive medium and measuring angular rotation of a body by optically detecting certain characteristics in the light transmission or emission properties of the collection of particles, said optically detectable characteristics being proportional to angular rotation.

In one embodiment of this invention an alkali metal vapor, in a container means such as a vapor gas cell, is illuminated by a first right circularly polarized light beam of optical pumping electromagnetic radiation emitted from a lamp containing vapor of the same alkali metal. As a result, the spectral content of this first light beam is such that it always contains energy in the particular frequencies required to effect the preferred orientation of the alkali metal atoms in the gas cell. The gas cell is subjected to a unidirectional magnetic field, parallel to the optical pumping electromagnetic radiation, and the preferred orientation of the gas cell atoms results in a net magnetization of the gas cell atoms in a direction parallel to that of the applied magnetic field. A second beam of right circularly polarized light (the optical detection electromagnetic radiation) from a lamp also containing vapor of the same alkali metal traverses the gas cell in a direction normal to the direction of the optical pumping electromagnetic radiation and impinges on a detector. After initial orientation, the optical pumping electromagnetic radiation, the optical detection electromagnetic radiation, and the unidirectional magnetic field are extinguished for a short time period, after which the unidirectional magnetic field and the optical detection electromagnetic radiation are restored. During this short time period then, a relative angular rotation between the unidirectional magnetic field and the comparatively freely floating atoms in the gas cell has occurred. Therefore, there is a precessional motion of the net magnetization of the atoms about the restored unidirectional magnetic field. This precessional motion causes a change in the properties of the optical detection electromagnetic radiation, proportional to the relative angular rotation, as it traverses the atoms in the gas cell, and the detector measures this change and thereby provides the desired indications of the angular rotation of the body. This cycle is repeated at convenient time intervals.

In other embodiments of this invention an angular rotation rate is continuously measured by detecting a steady-state component of the net magnetization of the aligned particles that is proportional to the angular rotation rate.

The invention will be described in detail with reference to the following drawings in which.

Figure 6:
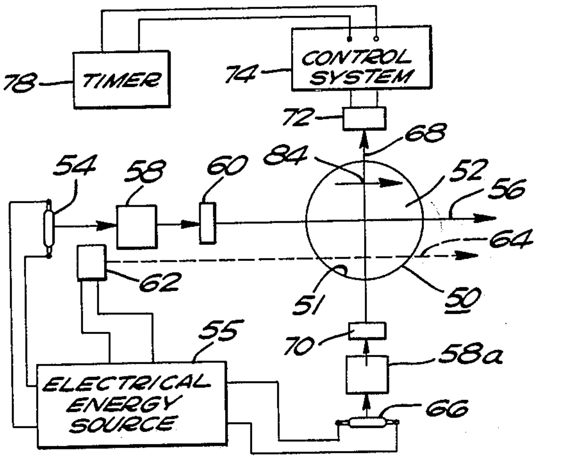
FIG. 6 is a schematic representation of a transient rotational rate measuring embodiment of this invention.
Figure 9:
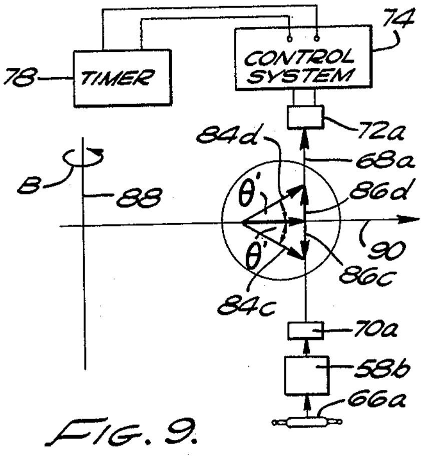
Figure 10:
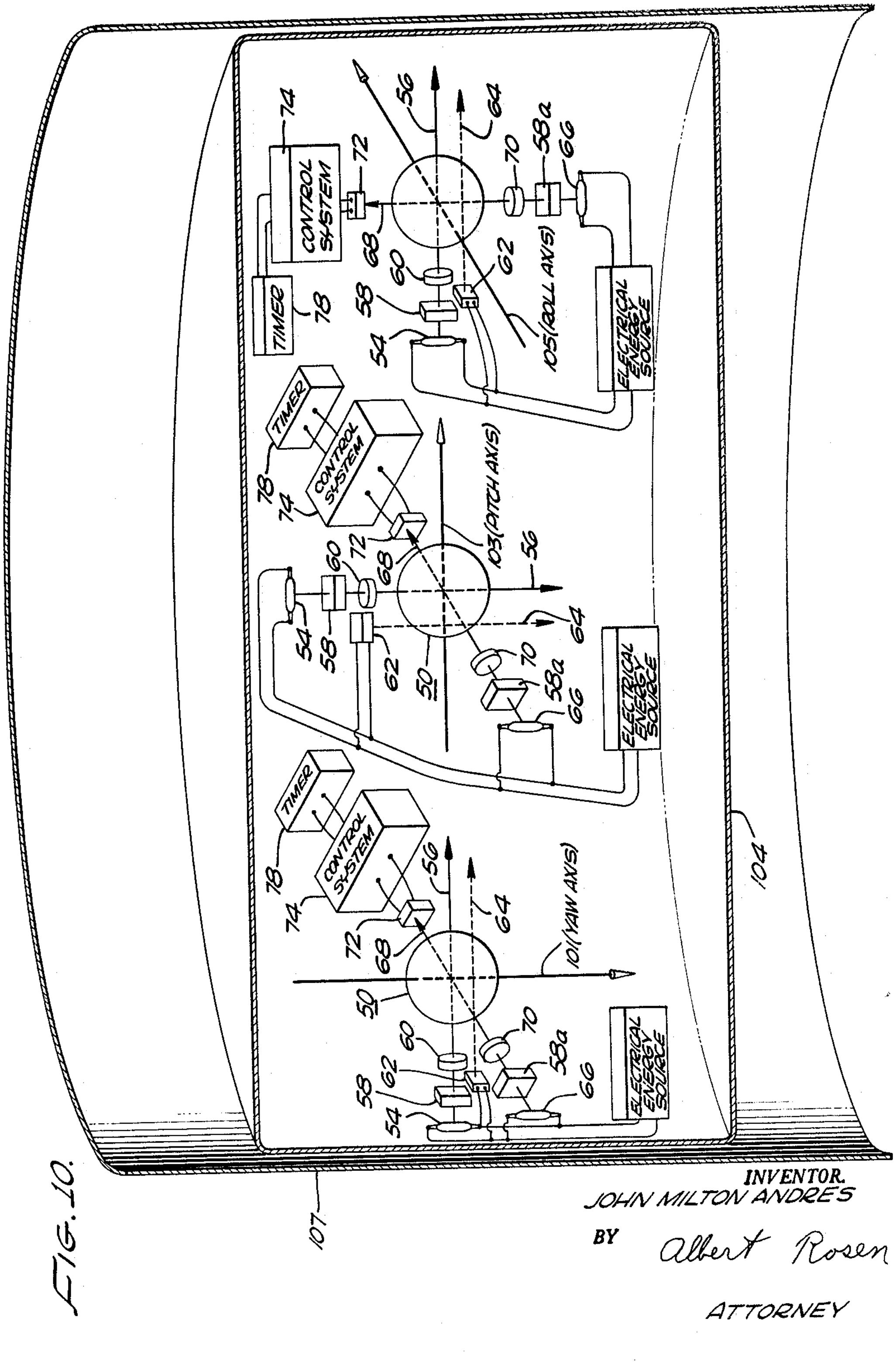
Figures 11, 12, 13, 14, 16:
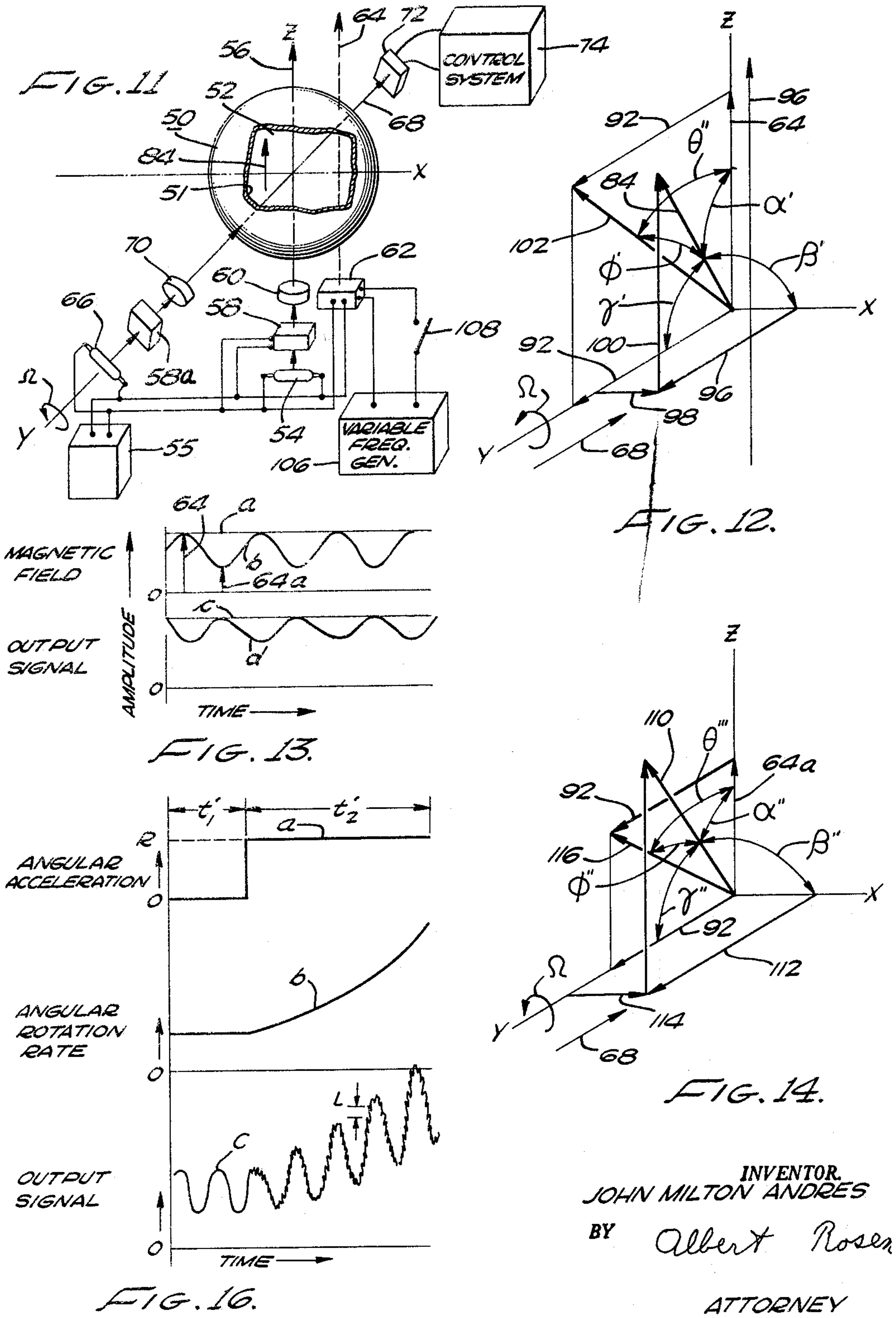
Figure 15:
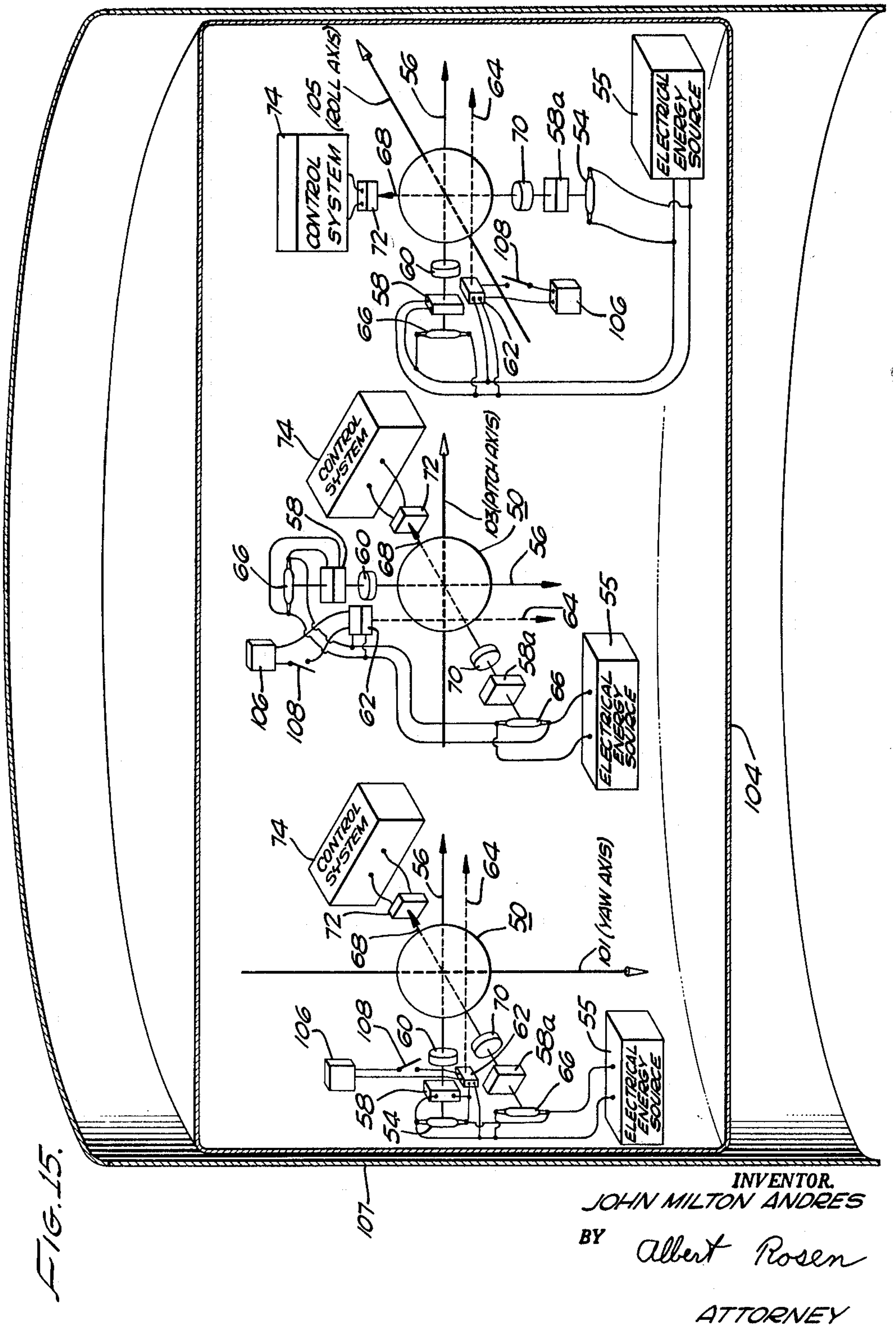

FIG. 8*a* through FIG. 8*e* show the wave forms associated with the operation of the embodiment shown in FIG. 6;

FIG. 9 is a schematic representation of another transient rotational rate measuring embodiment of this invention;

FIG. 10 is a pictorial representation of the embodiment of this invention illustrated in FIG. 6 as utilized in a three-axis rotational rate measurement system;

FIG. 11 is a semi-pictorial presentation of a steady state rotational rate measuring embodiment of this invention;

FIG. 12 is a vector diagram showing the magnetic field vectors associated with the operation of the embodiment of FIG. 11;

FIG. 13*a* through FIG. 13*d* show the wave forms associated with the operation of the embodiment shown in FIG. 11;

FIG. 14 is a vector diagram illustrating the magnetic field vectors associated with another mode of operation of the embodiment of this invention;

FIG. 15 is a pictorial representation of a steady state three-axis rotational rate measurement system according to this invention; and FIG. 16*a* through FIG. 16*c* show the wave forms associated with an angular acceleration embodiment of this invention.

Similar reference characters are applied to similar elements throughout the drawings.

The arrangements of this invention are predicated on certain gyromagnetic characteristics associated with the quantum electronics properties of the atomic structure. Therefore, a brief discussion of this phenomenon is presented prior to a detailed discussion of the embodiments of this invention.

*Atomic Structure*

The structure of an atom may be described as consisting of a rotating, centrally located nucleus with planetary electrons that not only orbit around this nucleus but also spin on their own axis. Both the nucleus and the electrons are electrically charged masses and, as such, their respective rotations give rise to both angular momentum and magnetic moment characteristics.

By quantum mechanics theory the electrons are arranged around the nucleus in discrete shells, and, further, there is a maximum number of electrons allowable in each shell. When a shell contains this maximum number of electrons, it is termed a "closed shell" and the magnetic moments and spin angular momentum characteristics of each of these electrons in a closed shell are effectively cancelled by the other electrons. Therefore, these electrons in closed shells may be considered inert in the sense that they do not contribute to the particular phenomena associated with the embodiments of this invention.

Certain atomic structures, however, have the first electron of a new shell outside of a closed shell and, in general, the atoms with this configuration are the alkali metals: sodium, potassium, rubidium, and cesium. These are generally classified in the periodic arrangement of the elements as Group I. Since there are no other electrons in the outermost shell with which this single electron can interact, the orientation of this electron with respect to its nucleus can be readily changed by the application of outside forces.

The orientation of the axis of spin of the outermost electron is generally parallel to the axis of spin of the nucleus. If the direction of rotation of the nucleus and electron is the same, the angular momentum vectors representing the effect of these rotating masses will be in the same direction and thus additive with respect to each other. If the direction of rotation is opposite, the angular momentum vectors will be opposite and subtractive with respect to each other.

*Atomic Angular Momentum*

Figure 1:
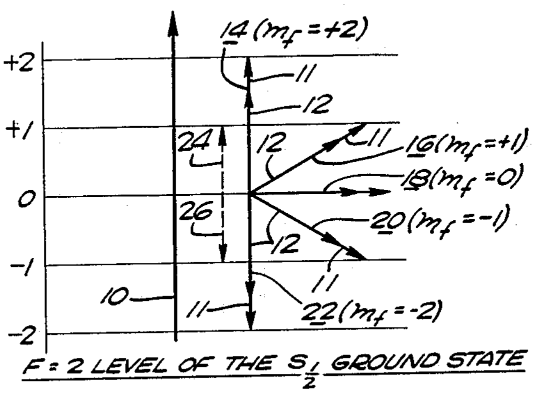
FIG. 1 is a schematic representation of one quantum energy level of a rubidium 87 atom.
Figure 2:
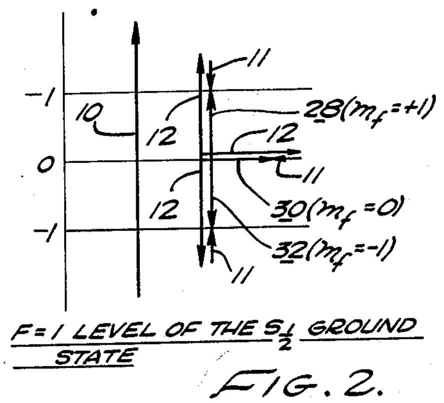
FIG. 2 is a schematic representation of another quantum energy level of the rubidium 87 atom.

FIGURES 1 and 2 show a schematic representation of the angular momentum vectors of a rubidium atom with an atomic weight of 87. Only the effects of the rotating nucleus and rotating outermost electron are considered in these two figures, the inner closed shells being relatively neutral. The rubidium 87 atom has been chosen for illustrative purposes only and it will be appreciated that other atoms and elementary particles can also be utilized in practicing this invention.

The angular momentum due to the rotation of this nucleus about its axis is assigned a quantum number of three-halves and the spin angular momentum of the outermost electron about its spin axis is assigned a quantum number of one-half. In FIG. 1 the vectors are shown for the condition that the rotation of the electron is in the same direction as the rotation of the nucleus. By definition, the letter "F" equals the vector sum of the nuclear angular momentum and electron spin angular momentum, and the condition shown in FIG. 1 is termed, by those skilled in the art, as the $F=2$ level of the $S_{1/2}$ ground state of this atom. The line 11 represents the vector of the electron spin angular momentum, and the line 12 represents the vector of the nuclear angular momentum. A requirement of quantum mechanics is that the projection of the sum of these two vectors in the direction of an externally applied magnetic field 10 can only occur in discrete, integer values. These are termed the magnetic substates and for the $F=2$ level these values may be: $+2$, $+1$, zero, $-1$, and $-2$. These various magnetic substates are designated the $m_f$ substates of the $F=2$ level. On FIG. 1 for the $F=2$ level the $m_f=+2$ magnetic substate is represented by the line 14; $m_f=+1$ magnetic substate is represented by the line 16; $m_f=$zero magnetic substate is represented by the line 18; $m_f=-1$ magnetic substate is represented by the line 20; and $m_f=-2$ magnetic substate is represented by the line 22. The projections of the $m_f=+2$ magnetic substate and $m_f=-2$ magnetic substate in the direction of the magnetic field 10 are seen to be two units, with the former being in the same direction as magnetic field 10 and the latter being in the opposite direction to the magnetic field 10. The projection of the $m_f=$zero magnetic substate in the direction of the magnetic field 10 is seen to be zero. The projection of the $m_f=-1$ magnetic substate, represented by dotted line 26, is seen to be one unit in a direction opposite to the magnetic field 10; and the projection of the $m_f=+1$ magnetic substate, represented by dotted line 24, is seen to be one unit in the same direction as the magnetic field 10.

In addition to the $F=2$ level of the atom, another possible level exists when the electron spin is in a direction opposite to the nuclear spin. FIG. 2 shows the atomic condition existing when the direction of spin of the electron is opposite to the direction of rotation of the nucleus. The electron spin angular momentum vectors 11 are opposite to the direction of the nuclear rotation angular momentum vectors 12. This state is termed, by those skilled in the art, the $F=1$ level of the $S_{1/2}$ ground state. The laws of quantum mechanics restrict the $m_f$ magnetic substate values in the $F=1$ level of the $S_{1/2}$ ground state to values of $+1$, 0, and $-1$. The $m_f=+1$ magnetic substate, represented by line 28, is seen to have a projection of one unit in the direction of the magnetic field 10; the $m_f=$zero magnetic substate, represented by line 30, is seen to have zero projection in the direction of the magnetic field 10; and the $m_f=-1$ magnetic substate, represented by line 32, has a projection of one unit in a direction opposite to the magnetic field 10.

*Atomic Magnetic Moments*

The strength of the magnetic moments associated with a rotating, charged nucleus and the spinning, charged electrons are inversely proportional to their masses. Since the mass of the particles contributing to the nuclear mass of the rubidium 87 nucleus is several orders of magnitude greater than the mass of the electron, the contribution of the nuclear magnetic moment is negligible with respect to the electron magnetic moment. Thus, the magnetic moments associated with the electron play a predominant role in the practice of this invention where such magnetic moments are present. However, in certain atomic structures the magnetic moments associated with the electron are effectively cancelled out due to the orientation of the electrons and for these type atoms the magnetic moments associated with the nucleus are predominant in the practice of this invention. The direction of the magnetic moment associated with an electron is opposite to the direction of its angular momentum vector. The direction of the magnetic moment associated with the nucleus may be either in the same direction or in an opposite direction to its angular momentum vector dependent upon the sign associated with the nuclear spin. For the rubidium 87 atom which is utilized as an example in the description of the embodiments of this invention, the nuclear magnetic moment is in the same direction as the nuclear angular momentum vector. For convenience, in the following description of the embodiments of this invention reference is made to the direction of the angular momentum vector and it will be appreciated that the direction of the net magnetic moment is in accordance with the above described principles. The above discussion delineates the theoretical area of atomic structure being operated on by the present invention. In order to provide other than random alignment of the outer shell electron, it is necessary to apply preselected forces to the atoms.

*Optical Pumping*

Figure 3:
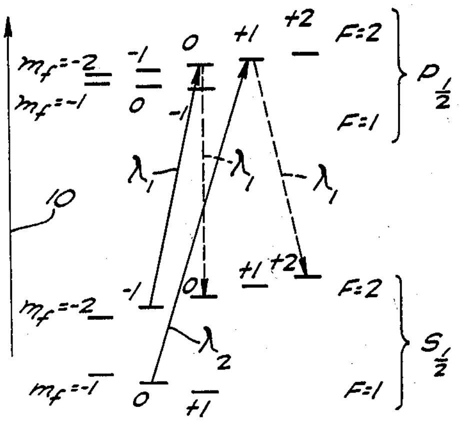
FIG. 3 is a schematic representation of the transitions between various quantum energy states of the rubidium 87 atom.

FIGURE 3 shows schematically the transitions of the rubidium 87 atom, described above, from the $S_{1/2}$ ground state ($F=2$ and $F=1$) up to the $P_{1/2}$ first optically excited state. The wave length of the energy separation between the $F=2$ level of the $S_{1/2}$ ground state and the $P_{1/2}$ first optically excited state is defined as $\lambda_1$; the wave length of the energy separation between the $F=1$ level of the $S_{1/2}$ ground state and the $P_{1/2}$ first optically excited state is defined as $\lambda_2$. When right circularly polarized light which includes wave lengths equal to $\lambda_1$ and $\lambda_2$ (shown schematically on FIGURE 3 and termed the optical pumping electromagnetic radiation), impinges upon a randomly oriented collection of rubidium 87 atoms, collisions between the atoms and the photons in this light occur. The photon energy associated with the optical aligning electromagnetic radiation of wave length $\lambda_1$ and $\lambda_2$ is sufficient to raise the energy of the atoms to the $P_{1/2}$ first optically excited state. In the $P_{1/2}$ first optically excited state there exist energy levels corresponding to both the $F=2$ and $F=1$ levels as well as the $m_f$ magnetic substates. However, the energy separation between $F=1$ and the $F=2$ levels as the $P_{1/2}$ first optically excited state is very much less than the corresponding separation at the $S_{1/2}$ ground state and, in fact, the energy difference between $F=1$ and the $F=2$ levels at the $P_{1/2}$ first optically excited state is virtually unresolvable.

In the practice of this invention it is desirable to optically pump out the $F=1$ into the $F=2$ level of the $S_{1/2}$ ground state and also to saturate the $m_f=+2$ magnetic substate of the $F=2$ level of the $S_{1/2}$ ground state. Referring to FIGURE 1 it can be seen that this $m_f=+2$ magnetic substate of the $F=2$ of the $S_{1/2}$ ground state corresponds to a maximum angular momentum energy condition. In order to achieve this saturation of the $m_f=+2$ magnetic substate of the $F=2$ level of the $S_{1/2}$ ground state, certain characteristics must be present in the light of wave lengths $\lambda_1$ and $\lambda_2$. These characteristics are achieved by utilizing the right circularly polarized light as the pumping light. When $\lambda_1$ and $\lambda_2$ are right circularly polarized, the angular momentum characteristics of the photons associated with these two wave lengths are such that on collision with the atoms, the atoms can only gain one $m_f$ magnetic substate number in being excited to the $P_{1/2}$ first optically excited state. On subsequent collapse of the atoms to the $S_{1/2}$ ground state during which radiation is emitted from the atoms at approximately wave lengths $\lambda_1$ and $\lambda_2$), they can return to either the $F=1$ or $F=2$ level of the $S_{1/2}$ ground state at an $m_f$ magnetic substate either one greater, one less, or the same as it occupied at the $P_{1/2}$ first optically excited state. Statistically, there is equal probability of an atom returning to any one of these three magnetic substates. (Since atoms already in the $m_f=+2$ magnetic substate of the $F=2$ level of the $S_{1/2}$ ground state cannot gain one $m_f$ magnetic substate number, they are not raised to the $P_{1/2}$ first optically excited level). It may be seen, then, that as this pumping action continues, virtually all atoms will tend to populate $m_f=+2$ magnetic substate of the $F=2$ of the $S_{1/2}$ ground state, which is the desired condition for the angular momentum and magnetic moment vectors of each individual atom.

The magnetic moment vectors referred to above that are associated with these atoms are parallel to the angular momentum vectors shown on FIGURES 1 and 2 and have a direction as previously described. When an external magnetic field is present, these magnetic moments are optically alignable and tend to align themselves in a direction parallel to the external magnetic field. Therefore, when atoms have been pumped into the $m_f=+2$ magnetic substate of the $F=2$ level of the $S_{1/2}$ ground state and an external uniform magnetic field 10 (FIG. 1) is then applied, the atoms will be aligned to give a resultant net angular momentum and net magnetic moment equal to the sums of the contributions from each of the individual atoms parallel to this external magnetic field. As long as the pumping light remains focused on the gas cell, this orientation will be retained despite the tendency of the atoms to attain a random distribution in the various $m_f$ magnetic substates due to inter-atomic collisions.

Assume that the atoms are originally aligned as described above in the direction of an external magnetic field and then the direction of the external magnetic field and the pumping light is changed with respect to the atoms. The atoms will have a tendency, due to their magnetic moments and the pumping light, to realign to the changed magnetic field direction. However, the angular momentum of the atoms tends to resist this change and the result is a damped precession motion of the atoms about this changed magnetic field direction. (The precessional rate is unique for each different particle and is termed the Larmor frequency.) This precessional motion, of course, is highly damped as the pumping light and magnetic field try to orient the atoms in the changed direction. However, in a transient condition before this new orientation is achieved, the processing magnetic moment will have a component perpendicular to the changed direction of the magnetic field and the strength of this component is proportional to the angular difference between the changed magnetic field direction and the original magnetic field direction.

Figure 4:
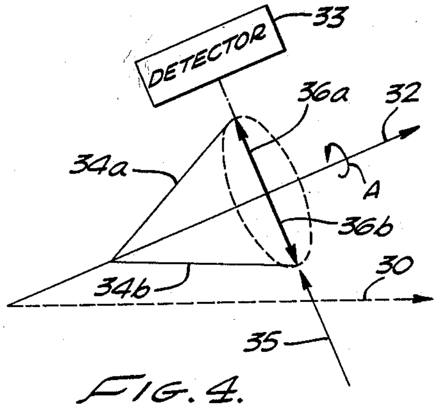
FIG. 4 is a schematic representation of the precessional motion associated with one embodiment of this invention.

FIGURE 4 shows a schematic representation of this phenomena. The original magnetic field and optical pumping light direction is indicated by dotted line 30. The changed magnetic field and optical pumping light direction is indicated by line 32. The vector representing the angular momentum and magnetic moment is indicated by lines 36a and 36b. Direction of precession of the magnetic moment 34 is indicated by an arrow "A."

*Optical Detection*

Since the magnitude of the perpendicular magnetic component 36 is proportional to the angle between the original magnetic field direction 30 and the changed magnetic field direction 32, a quantitative measurement of this component will give a measure of the angle between the original and changed magnetic field directions. In accordance with the principles of this invention the detection of this component is accomplished by optical means. In one embodiment, an optical detection light beam 35 which includes circularly polarized electromagnetic radiation of the wavelength equivalent to $\lambda_1$ (shown in FIG. 3) is directed onto this collection of atoms in a direction perpendicular to the changed magnetic field direction 32. As the net magnetic moment of the atoms 34 precesses about the changed magnetic field direction 32 at the Larmor frequency, the components 36a and 36b, perpendicular to the changed magnetic field direction, will alternately appear to be first in the same direction 36a and then in the opposite direction 36b as the detection light beam 35. When the component of the net magnetic moment is in the same direction as the detection light beam it will appear to be in the $m_f=+2$ magnetic substate of the $F=2$ level of the $S_{1/2}$ ground state and therefore no energy can be absorbed from the detection light beam 35 by the atoms. However, when the component of the net magnetic moment appears to be in the opposite direction to the detection light beam 35, it will appear to the detection light beam as if the atoms were in the $m_f=-2$ magnetic substate of the $F=2$ level of the $S_{1/2}$ ground state and, hence, energy will be absorbed from the detection light beam 35 as it tries to pump these up to the $P_{1/2}$ first optically excited state in a manner analogous to the optical pumping described above. This absorption of energy reduces the amplitude of the detection light beam 35. As noted above, the precessional rate is at the Larmor frequency; the detection light beam, then, is effectively amplitude modulated at the Larmor frequency after it traverses the collection of atoms. A detector 33 that is sensitive to at least the wave length $\lambda_1$ is oriented to receive the detection light beam 35 after it so traverses the collection of atoms. This detector 33 senses the change in amplitude of the detection light beam 35 that is proportional to the strength of the magnetic moment component perpendicular to the new magnetic field direction. This change in amplitude, as detected by the detector 33, is a measure of the angular difference between the changed magnetic field direction 32 and the original magnetic field direction 30.

As described above, this embodiment of the invention senses the effect of the transient condition during which time there is a precession of the net angular momentum and magnetic moment vector 24 about the changed magnetic field direction 32. However, if the angular rotation rate continues for a time period in excess of the damping time, the net magnetic moment and angular momentum vector of the particles assume a stable orientation making a fixed angle with the externally applied magnetic field. This angle is proportional to the angular rotation rate and results from the apparent equivalence of an angular rotation rate to a magnetic field in its effect on a collection of aligned particles.

It has been found that when an angular rotation rate is impressed upon a collection of aligned particles, as described above, the angular velocity is equivalent to an externally applied magnetic field. The direction of this equivalent magnetic field is along the axis of rotation and the strength of the equivalent magnetic field is dependent on the unique characteristics of the particular particle and the value of the angular velocity. Remembering that the aligned particles have both an angular momentum and a magnetic moment, a quantity termed the gyromagnetic ratio is defined as the ratio of the magnetic moment to the angular momentum. The ratio of the angular rotation rate to the gyromagnetic ratio yields the strength of the equivalent magnetic field caused by the angular rotation rate.

Figure 5:
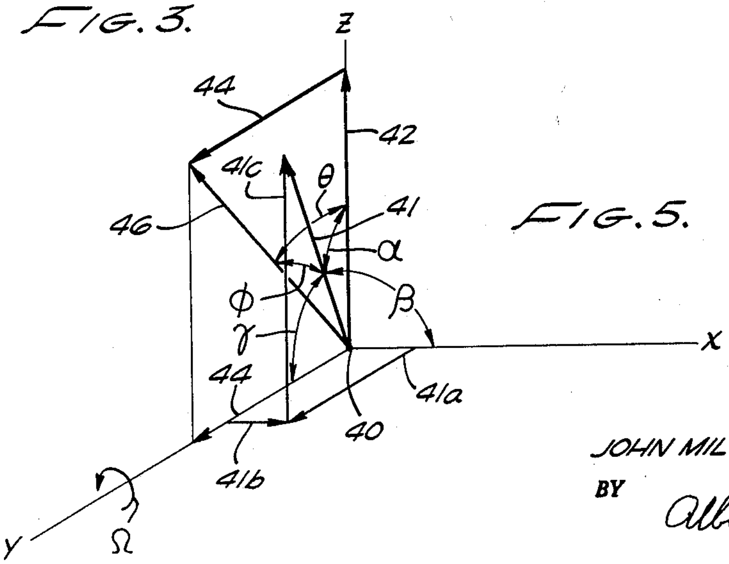
FIG. 5 is a vector diagram of the magnetic field vectors associated with another embodiment of this invention.

FIG. 5 shows a schematic representation of the equivalence of an angular rotation to a magnetic field. The origin 40 at the center of the three mutually perpendicular axes X, Y, and Z represents a collection of aligned atoms with a net angular momentum and magnetic moment vector 41. An external magnetic field 42 is applied to the collection of particles 40 along the Z axis. Also, there is a constant angular rotational rate, $\Omega$, about the Y axis. When the value of this rotational rate is divided by the gyromagnetic ratio, as described above, the strength of an equivalent magnetic field 44 which is directed along the Y axis is obtained. The vector sum of this equivalent magnetic field 44 and the external magnetic field 42 equals the effective magnetic field 46. When the rotational rate $\Omega$ about the Y axis is maintained for a time period sufficient so that the precessional motion of the net magnetic moment vector 41 at the Larmor frequency is damped out, the net magnetic moment vector 41 will assume an orientation making an angle $\phi$ with the effective magnetic field 46. Since the angle $\theta$ between the effective magnetic field 46 and the external magnetic field 42 is proportional to the rotational rate $\Omega$, the angle $\phi$ between the net magnetic moment vector 41 and the effective magnetic field 46 is also proportional to the angular rotational rate $\Omega$. The net magnetic moment vector 41 does not lie in the plane defined by the effective magnetic field 46 and the externally applied magnetic field 42 but is inclined to it. Therefore, the net magnetic moment vector 41 makes an angle $\alpha$ with the Z axis; and angle $\beta$ with the X axis; and an angle $\gamma$ with the Y axis. As a result, the net magnetic moment vector 41 may be considered to be made up of the vector sum of components 41*a* parallel to the Y axis, 41*b* parallel to the X axis, and 41*c* parallel to the Z axis. All three of these component vectors are dependent upon the angular rotational rate $\Omega$. As applied to the present invention the optical detection light may be oriented either along the X axis or along the Y axis to measure one of these component vectors and thus measure the angular rotational rate $\Omega$.

The gyromagnetic ratio is also useful in computing the Larmor frequency referred to above. When an external magnetic field is applied to an aligned collection of particles in a direction different than the direction of alignment, the particles process around this field at the Larmor frequency. This frequency is easily calculated and is equivalent to the product of the magnetic field strength multiplied by the gyromagnetic ratio.

Other methods of optical detection are described in the detail description of the various embodiments of this invention as outlined below.

While rubidium 87 has been utilized in the above examples describing the phenomena of magnetic alignment, it will be appreciated that all the alkali metals such as potassium, sodium, and cesium may also be similarly utilized. In addition it has been found that meta-stable helium, thallium vapor, and mercury vapor are also capable of being so aligned by optical pumping radiation and a unidirectional magnetic field. Further, free electrons and other elementary particles may also be aligned by optical pumping. Therefore this invention is not limited to the atoms of any one element or group of elements, but all particles with a net angular momentum and net magnetic moment capable of being optically pumped and aligned in a particular preferred direction are useful in practicing this invention.

This optical pumping and alignment capability proves useful, in accordance with the invention, in enabling the establishment of a collection of atoms, within a container means, having a net angular momentum and magnetic moment. If such an alignment in a preferred orientation direction is established, and the container means defines a cavity that is symmetrical with substantially all orientations of the net magnetic moment and angular momentum within the cavity, the direction of this orientation is independent of the orientation of its container. Consequently, motion of the container relative to its contents can be used to generate control signals for guidance purposes. For the purposes of a simplified explanation, the cavities will be described as having a spherical form.

Since, as referred to above, inter-atomic collisions tend to destroy the preferred orientation, the preferred embodiment of this invention utilizes the vapor of the atoms or particles within the cavity in order to minimize such inter-atomic collisions. This is accomplished in a typical gas cell wherein the pressure is on the order of fractions of a millimeter of mercury. Thus the atoms will be relatively far apart and the number of inter-atomic collisions kept at a minimum. The walls of the gas cell defining the cavity are of a material that is magnetically transparent and transparent to at least the particular electromagnetic radiation wavelengths required to achieve pumping, alignment, and detection.

The physical principles and gyromagnetic characteristics described above are utilized in this invention in a gyroscopic device. FIG. 6 shows a schematic representation of one embodiment of this invention. In this embodiment the angular rotation rate is measured periodically. A container means, defining a cavity such as a gas cell 50, has walls 51 that are transparent to magnetic energy and at least to specified wave lengths of electromagnetic radiation. The gas cell 50 contains an optically alignable medium 52. For purposes of illustration this medium 52 may be considered to be gaseous rubidium atoms having an atomic weight of 87 (rubidium 87 atoms). As described above, these atoms are alignable into the $m_f=2$ magnetic substrate of the $F=2$ level of the $S_{1/2}$ ground state by subjecting them to optical pumping electromagnetic radiation of specified wave lengths. According to this invention, these wave lengths are automatically obtained from an optical pumping means or pumping lamp 54 which also contains rubidium 87 atoms. When these atoms in the pumping lamp 54 are electrically excited by an electrical energy source 55 they are raised to higher energy states from the $S_{1/2}$ ground state and one of these higher states is the $P_{1/2}$ first optically excited state. In this process electromagnetic radiation, which includes wave lengths equivalent to $\lambda_1$ and $\lambda_2$ of FIG. 3, along with other wave lengths are emitted by the pumping lamp 54.

A line 56 indicates the optical pumping electromagnetic radiation or pumping light beam of wave lengths $\lambda_1$ and $\lambda_2$. Before impinging on the collection of atoms 52 in the gas cell 50, the pumping light beam 56 has first passed through a polarizer means 58 which converts the electromagnetic radiation emitted from pumping lamp 54 to right circularly polarized beams and then through a filter means 60 which transmits substantially only the wave lengths $\lambda_1$ and $\lambda_2$. The pumping light beam 56 then passes through the walls 51 of the gas cell 50, which are transparent to at least the wave lengths $\lambda_1$ and $\lambda_2$, and impinges on the atoms 52. At the same time, a magnetic field generating means 62 subjects the atoms 52 to a unidirectional magnetic field represented by the line 64 which is substantially parallel to the pumping light beam 56. The combination of the pumping light beam 56 and the unidirectional magnetic field 64 aligns the atoms 52 so that there is a net angular momentum vector and magnetic moment vector 84 of the atoms 52. A detection lamp 66 is oriented to emit electromagnetic radiation of substantially similar characteristics to those emitted by the pumping lamp 54. A polarizer means 58a is provided to convert the electromagnetic radiation from the detection lamp 66 to a right circularly polarized beam and a filter 70 filters this radiation emitted from the detection lamp 66 so that a detecting light beam 68 is composed of energy at least of wave length $\lambda_1$. An optical detection means or electromagnetic radiation detector 72 is oriented to receive the detection light beam 68 after it traverses the gas cell 50 in a direction substantially perpendicular to the direction of the optical pumping light beam 56. The detector 72 is sensitive to electromagnetic radiation of at least wave length $\lambda_1$ and detects changes in the amplitude strength of wave length $\lambda_1$ of the detection light beam 68. The detector 72 includes a signal generating means that provides an output signal proportional to changes in the amplitude strength of the detection light beam 68 and transmits this signal to a control system 74 wherein an appropriate control response is initiated.

Figure 7:
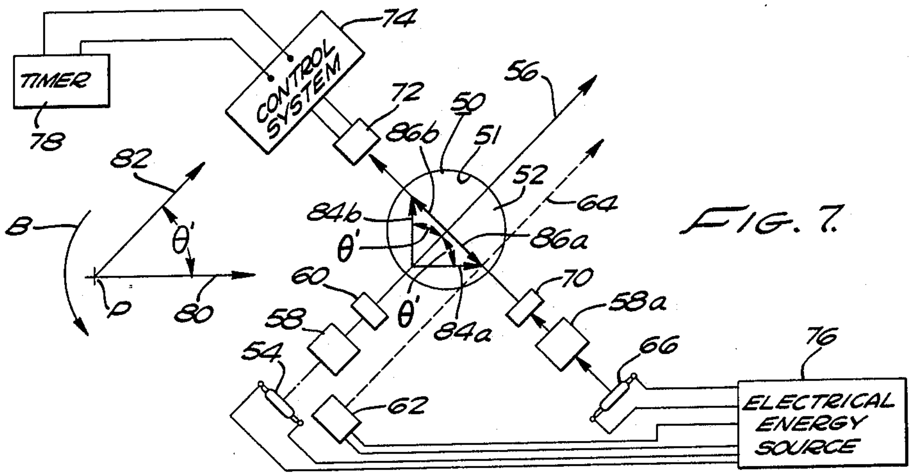
FIG. 7 is a schematic representation illustrating the operation of the embodiment shown in FIG. 6.

In order to explain further the operation of the present invention, FIG. 7 illustrates the operation of the embodiment of the invention shown on FIG. 6. Assume that the arrangement, shown schematically in FIG. 7, was originally oriented so that the magnetic field vector 64 and pumping light beam 56 were parallel to the direction indicated by a line 80. In a time interval $\Delta t$, measured by a timer 78, assume that the entire assembly of FIG. 7 has rotated about an arbitrary axis that passes through a point P and has a direction perpendicular to the plane of the paper in a counterclockwise direction as indicated by an arrow B. In this time interval $\Delta t$, the assembly has rotated through an angle $\theta'$. In this embodiment it is assumed that the pumping lamp 54 is extinguished at the start of time interval $\Delta t$. The detection lamp 66 may be kept on during time interval $\Delta t$ or may be extinguished during time interval $\Delta t$. At the end of time interval $\Delta t$ the magnetic field vector 64 is parallel to a line 82 and the detection lamp 66 is turned on. The net angular momentum and magnetic moment vector 84 then precesses about the changed direction of the magnetic field vector 64 as it attempts to align itself in this new direction. This precession is at the Larmor frequency (as noted above) and the net magnetic moment vector 84 alternately occupies the positions shown by the lines 84a and 84b. When the net angular momentum and magnetic moment vector 84 occupies the position indicated by the line 84a it has a component 86a parallel to and in the same direction as detection light beam 68, and when the net angular momentum and magnetic moment vector 84 occupies the position indicated by the line 84b it has a component 86b parallel to and in a direction opposite to the detection light beam 68. Thus the amplitude of detecting light beam 68 is modulated at the Larmor frequency after traversing the atoms 52. The detector 72 measures the amplitude modulation and sends a signal proportional to the amplitude modulation to the control system 74 to initiate an appropriate response.

Figure 8:
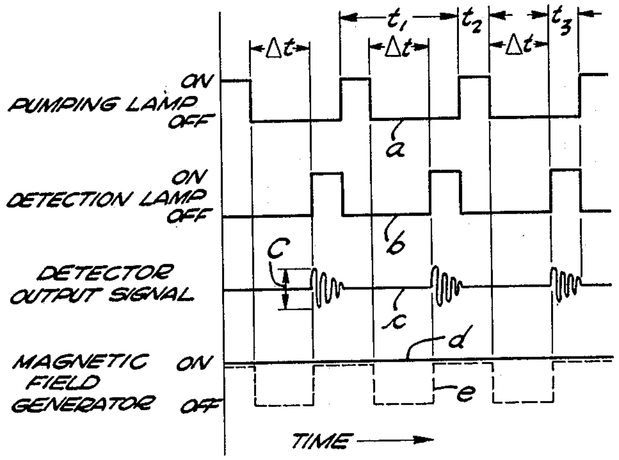

The cyclic operational characteristics of this embodiment of the invention can better be understood by a consideration of FIG. 8 wherein is shown a comparison, on a time basis, of the sequential operations of the embodiment illustrated in FIG. 7. The ON-OFF cycle of the pumping lamp 54 indicated as $t_1$ in FIG. 8a', the time that the pumping lamp 54 is ON indicated as $t_2$ in FIG. 8a, and the time that the detection lamp is ON indicated as $t_3$ in FIG. 8b are all selected from considerations of the desired frequency of measuring the angular velocity and the time interval required for the aligned particles or atoms to lose their preferred orientation and revert to a random orientation. This tendency of the particles to revert to a random orientation acts as a damping process on the precession of the magnetic moment and angular momentum vector about the magnetic field. Thus the detector output signal, shown on FIG. 8c, is damped as the magnitude of the magnetic moment component in the direction of the pumping light decreases. In this embodiment, the unidirectional magnetic field generator 62 is kept on continuously, as shown in FIG. 8d. The detection lamp ON period, indicated by time $t_3$ in FIG. 8b, occurs while the pumping lamp 54 is OFF. Since the pumping lamp 54 would tend to constantly realign the atoms in a direction parallel to the changed magnetic field direction, it would accelerate the damping process. When it is desired to obtain the maximum number of large amplitude cycles in the detector output signal, FIG. 8c, the pumping lamp 54 is kept dark during detection.

After detection, during time interval $t_2$ of FIG. 8a, the pumping lamp 54 is again energized and, in conjunction with the magnetic field, will realign the particles in this changed direction. The amplitude C of the output signal in FIG. 8c is a measure of the total angle $\theta'$ through which the assembly has rotated during the time interval $\Delta t$. The time $t_3$ is usually kept small in comparison with the time interval $\Delta t$. Thus, the rotational rate information obtained is substantially an average rate for the time interal $\Delta t$. For high accuracy in approaching the true instantaneous rotation rate, this time interval $\Delta t$ should preferably be kept as small as possible.

Thus the operation of one embodiment of this invention has been described. In another embodiment of this invention both the pumping lamp 54 and magnetic field generator 62 are turned OFF during the time interval $\Delta t$ of FIG. 8. However, the magnetic field generator is turned ON during the detection time $t_3$ and the pumping time $t_2$ as shown by the dashed line in FIG. 8e. Therefore, at the end of time interval $\Delta t$, when the magnetic field generator 62 is turned ON, the magnetic field vector will make an angle $\theta'$ (FIG. 7) with the magnetic moment vector. This angle $\theta'$ is proportional to the product of the angular rotation rate of the assembly multiplied by the time interval $\Delta t$. The magnetic moment vector then precesses about the magnetic field vector in a manner similar to that described in connection with the embodiment described above, and an output signal from detector 72 is obtained that is similar to the output illustrated by FIG. 8*c*.

It will be appreciated that any orientation of the detection light beam 68 of FIG. 7 in a plane parallel to the axis of rotation and perpendicular to the magnetic field vector 64 will provide the same results as the particular orientation described in connection with FIGURES 6 and 7. FIG. 9 shows one other such orientation in which the direction of the detecting light vector 68 is parallel to the axis of rotation which is seen as line 88 in the schematic representation of FIG. 9. The direction of rotation is shown by arrow B.

The original orientation direction 80 of FIG. 7, the new orientation direction 82, the pumping light beam 56, and the magnetic field vector 64 become coincident when viewed in this direction and appear as a line 90. The angular momentum vector and magnetic moment vector 84, however, is precessing about the changed magnetic field direction 64 and hence alternately appears as vectors 84*c* and 84*d* shown in FIG. 9. It should be noted that the vectors 84*c* and 84*d* occur after 90 degrees of angular rotation at the Larmor frequency of vectors 84*a* and 84*b* respectively of FIG. 7. A detection lamp 66*a*, polarizer 58*b*, and filter 70*a* are oriented so that the detection light 68*a* is parallel to the axis of rotation 88. The detector 72*a* is oriented to detect the light beam 68*a* and transmit a signal to the control system 74. In a manner similar to that described in connection with FIG. 7, the detection light vector 68*a* is amplitude modulated at the Larmor frequency by components 86*c* and 86*d* of magnetic moment vector 84*c* and 84*d* respectively. Thus the output signal from detector 72*a* will be of the same magnitude as that from the detector 72 in FIG. 7 except that it will be 90 degrees out of phase from the detector 72 (FIG. 7) output signal. The operation of this embodiment is the same as the described in connection with FIG. 7 and FIG. 8.

In the above description of the embodiments of this invention illustrated in FIG. 6 it was assumed that rotation was about an axis perpendicular to the pumping light beam and detection light beam as shown on FIG. 7. It will be appreciated that rotation could be about any arbitrarily oriented axis, and as long as such an arbitrarily oriented axis had a component that was perpendicular to both the pumping light vector and detection light vector, an output signal proportional to the magnitude of such a component will be obtained. Thus, three of the assemblies illustrated in FIG. 6 would be sufficient to provide rotational rate information about three principle axes if the assemblies are properly oriented.

FIG. 10 shows such a proper orientation of three assemblies, as might be utilized in a vehicle 107, such as a missile or aircraft, to measure angular rotation. All components of the three assemblies are considered as rigidly attached to the vehicle 107. In a manner analogous to that described in connection with FIG. 7, a first assembly measures the rotational rate or component of rotational rate about a yaw axis 101; a second assembly measures the rotational rate or component of rotational rate about a pitch axis 103; and a third assembly measures rotational rate or component of rotational rate about a roll axis 105. The output signals from each detector of the three assemblies are fed into the vehicle control system to initiate proper response to said signals.

It is preferred that a magnetic shielding 104 be provided to shield the assemblies from external, stray magnetic fields.

In another embodiment of this invention a constant angular rotation rate is measured continuously. FIG. 11 shows a pictorial representation of an embodiment of this invention in which a constant angular rotation rate $\Omega$ about the Y axis is continuously measured. The X, Y, and Z axes shown on FIG. 11 are mutually perpendicular. For purposes of illustration, the elements of FIG. 11 may be assumed to have similar characteristics to the corresponding elements of FIG. 7. The pumping lamp 54, the polarizer 58, and the filter 60 are oriented to produce pumping light beam 56 along the Z axis. The magnetic field generator 62 is oriented to subject the atoms 52 in the gas cell 50 to a uniform unidirectional magnetic field 64 which is parallel to pumping light beam 56. The combination of the pumping light beam 56 and the magnetic field 64 acting on atoms 52 produces a net angular momentum and magnetic moment vector alignment 84 by the optical pumping action as described above. The atoms 52 have a high degree of orientation in the $m_f=+2$ magnetic substate of the $F=2$ level of the $S_{1/2}$ ground state and will thus tend to align themselves with the net effective magnetic field as is described below in connection with FIG. 12. The detection lamp 66, the polarizer 58*a*, and the filter 70 are oriented to produce a detection light beam 68 that traverses the gas cell 50 in a direction parallel to the Y axis. The detector 72 is oriented to receive the detection light beam 68 after it traverses the gas cell 50 and transmits a signal proportional to the strength of detection light beam 68 to the control system 74. The electrical energy source 55 provides the electrical energy for the pumping lamp 54, the magnetic field generator 62, the polarizers 58 and 58*a*, and the detection lamp 66.

As discussed previously, there is an equivalence of an angular rotation rate to a magnetic field and the magnetic field thus produced is proportional in strength to the magnitude of the angular rotation rate and inversely proportional to the gyromagnetic ratio of the vapor of atoms 52. Since the angular rotation $\Omega$ is about the Y axis, the equivalent magnetic field (not shown on FIG. 11) is also directed along the Y axis.

The operation of this embodiment may be more clearly understood by a reference to FIG. 12. This figure shows the magnetic field vectors and light beams as would be seen in the frame of reference of the axes X, Y, and Z as they rotate at the constant angular rotation rate $\Omega$. An equivalent magnetic field 92 shown hereon is equivalent in strength to the ratio of the angular rotation rate $\Omega$ to the gyromagnetic ratio. The vector addition of this equivalent magnetic field 92 to the external magnetic field vector 64 produces an effective magnetic field 102 which makes an angle $\theta''$ with the magnetic field vector 64. As discussed previously, in connection with FIG. 4, the net angular momentum and magnetic moment vector 84 will, under a constant angular rotation rate, assume an orientation making an angle $\phi'$ with the effective magnetic field 102, and angles $\alpha'$ with the Z axis, $\beta'$ with the X axis, and $\gamma'$ with the Y axis. As a result, there are components of the net angular momentum and magnetic moment vector 84 that are parallel to each of the three principal axes. These three components are illustrated as a vector 96 parallel to the Y axis, a vector 98 parallel to the X axis, and a vector 100 parallel to the Z axis. Each of these components is dependent upon the angular rotation rate $\Omega$ about the Y axis. The detection light beam 68, parallel to the Y axis, senses this component 96 and to the detection light beam 68, component 96 appears to be in the $m_f=-2$ magnetic substate of the $F=2$ level of the $S_{1/2}$ ground state. Accordingly, energy will be absorbed from detection light beam 68 as it attempts to pump the atoms 52 up to the $P_{1/2}$ first optically excited state so as to effect an alignment of the component 96 into the $m_f=+2$ magnetic substate of the $F=2$ level of the $S_{1/2}$ ground state. This absorption of energy from detection light beam 68 is sensed by the detector 72 (of FIG. 11). This resultant signal is a constant signal so long as the angular rotation rate $\Omega$ remains constant.

It is often desirable to have a cyclically varying output signal from the detector 72. This can be accomplished, according to this invention by varying, for example, the strength of the unidirectional magnetic field vector 64. In FIG. 11, a switch means 108 could be closed, thereby coupling a variable frequency generator means 106 to the magnetic field generator 62. Thus, there is a cyclically operable magnetic field generator means and instead of the magnetic field vector 64 being a steady unidirectional field as described above, it will then be a modulated unidirectional magnitude field. The exact frequency of the modulated field in this embodiment is not critical and, preferably, it does not correspond to any specific energy level transition or resonance condition of the atoms 52. FIG. 13 shows a comparison of the steady state magnetic field and the modulated magnetic field. FIG. 13*a* shows the magnetic field as a constant intensity during operation; FIG. 13*b* shows the magnetic field varying with time in, for example, a sinusoidal variation. A comparison of the output signal from the detector 72 during a constant angular rotation $\Omega$ is shown in FIGS. 13*c* and 13*d*. FIG. 13*c* shows the output signal waveform corresponding to the steady magnetic field of FIG. 13*a*, and FIG. 13*d* shows the output signal waveform corresponding to the variable magnetic field of FIG. 13*d*.

FIG. 12 shows the magnetic field and magnetic vector relationships both for the steady magnetic field 64 and also for the condition when the magnetic field is variable and at its peak intensity which, for purposes of illustration, is equivalent in strength to the steady magnetic field. FIG. 14 shows the same relationships as illustrated in FIG. 12 for the condition when the variable magnetic field is at a minimum value and equivalent to the vector 64*a* shown in connection with FIG. 13.

In FIG. 14 the magnetic field vector 64*a* has an instantaneous value less than the peak value of the magnetic field vector 64 (of FIG. 12). Under the same constant angular rotation rate $\Omega$ about the Y axis (as was assumed for FIG. 12), the equivalent magnetic field 92 has the same value in both FIG. 12 and FIG. 14. Since the magnetic field vector 64*a* is less intense than magnetic field vector 64, the angle $\theta'''$ between the effective magnetic field vector 116 and the magnetic field vector 64*a* is larger. Consequently, the angle $\phi''$ between the net angular momentum and magnetic moment vector 110 and the effective magnetic field vector 116 is different than the angle $\phi'$ shown on FIG. 12. The magnetic moment vector 110 also makes angles $\alpha''$ with the Z axis, $\beta''$ with the X axis, and $\gamma''$ with the Y axis which are different than the corresponding angles $\alpha'$, $\beta'$, and $\gamma'$ of FIG. 12, respectively. Therefore, the component 112, of the magnetic moment vector 110, that is parallel to the Y axis is less than the corresponding component 96 shown on FIG. 12. As a result, less energy from the detecting light beam 68 is absorbed and the output signal shown on FIG. 13*d* is at a maximum when the strength of the variable magnetic field vector 64*a* is at a minimum value, as shown on FIG. 13*b*.

It will be appreciated that other modulation methods may be utilized in the practice of this invention in order to provide a cyclically varying output signal. For example, the intensity of the pumping light beam might be modulated by a cyclically operable pumping light means. In each of these modulation techniques there will be a component of the net angular momentum and magnetic moment vector that is both proportional to the angular rotation rate and also varies with the modulation. Therefore, it is only necessary to orient the detection light beam and detector along the proper axis to sense this component. When a modulation is applied to the pumping light beam, as described above, the detection light beam should preferably be oriented along an axis that is normal to both the pumping light beam and the axis of rotation. This would be the X axis for the configuration shown on FIG. 11.

In addition to measuring angular rotation rate by means of a separate detection light beam, as described above, this invention also contemplates the measurement of the angular rotation rate by measuring certain other optically detectable characteristics of an aligned collection of particles. These properties are those that are affected by an angular rotation rate relative to their aligned orientation. For example, the pumping light beam 56 shown on FIG. 11 could be monitored. In this embodiment, the component of the net angular momentum and magnetic moment vector that is parallel to the Z axis is a function of the angular rotation rate about the Y axis. Hence, the amount of energy absorbed by the collection of particles decreases the intensity of the pumping light beam, which may then be detected by a detector oriented and adapted to receive the pumping light beam.

Other of the characteristics within the contemplation of this invention, such as the scattering of the pumping light beam, degree and/or direction of polarization of the pumping light beam after traversing the collection of aligned particles, and intensity or polarization of the light emitted by the collection of particles in the container means 50 may be measured to determine an angular rotation rate relative to the preferred orientation of the collection of particles. The physical principles and method of operation of these various embodiments are similar to those already described in connection with the arrangement illustrated in FIG. 11.

While FIG. 11 shows rotation about the Y axis which passes through the atoms 52, the configuration shown will also measure a component of rotation about the Y axis. Thus, if there were to be rotation about any arbitrarily oriented axis, the component of such rotation about the Y axis will be measured by the configuration illustrated in FIG. 11.

FIG. 15 shows an arrangement of three of the assemblies depicted on FIG. 11 and oriented to measure the angular rotation rate about each of the three principle axes shown. Thus, the first assembly measures rotation or component of rotation about the pitch axis 101; the second assembly measures rotation or component of rotation about the yaw axis 103; and the third assembly measures rotation or component of rotation about the roll axis 105.

This invention may also be utilized in an arrangement to measure an angular acceleration as well as an angular rotation rate. The arrangement illustrated on FIG. 11 may be exposed to a constant angular acceleration about the Y axis of magnitude R in the same direction as the rotational rate $\Omega$. If, for example, the apparatus is operating in the mode wherein the magnetic field is varied in intensity to provide a cyclically variable output signal, an alternating signal will be superimposed on this cyclically varying output signal. This superimposed signal will be at the Larmor frequency and its amplitude will be proportional to the acceleration. Referring again to FIG. 12, it can be seen that, since the components are in the accelerating frame of reference, the net angular momentum and magnetic moment vector 84 will precess about the accelerating effective magnetic field 102 during an angular acceleration and before the steady alignment is achieved. This, in turn, causes a cyclic variation, at the Larmor frequency, of component 96. In a manner analogous to that described in connection with the arrangement illustrated on FIG. 7, the amplitude of this cyclic variation, as detected by detection light beam 68, is proportional to the acceleration rate.

The wave forms associated with the operation of the angular acceleration measurement embodiment of this invention are illustrated in FIG. 16. During time $t_1'$ of FIG. 16 there is no angular acceleration, as shown on the curve of FIG. 16*a*, but there is a constant angular rotation rate, as shown on the curve of FIG. 16*b*. The curve of FIG. 16*c* shows the output signal during time $t_1'$, in which only the cyclic variation due to the variation in magnetic field strength is present. During time $t_2'$ there is a constant angular acceleration of magnitude R. During this time interval $t_2'$ the angular rotation rate is constantly increasing as shown on FIG. 16*b*, and the output signal shown on 16*c* also has a constantly increasing mean value. Also, during this time interval there is an alternating signal (at the Larmor frequency) superimposed on the output signal. The amplitude L, of this superimposed signal, is proportional to the acceleration rate R.

Many changes could be made in the above constructions of this novel invention and many apparently widely different embodiments of this invention could be made without departing from the true scope thereof. Such changes, for example, could be the utilization of a solid or liquid magnetic field responsive medium or the utilization of a left hand circularly polarized electromagnetic radiation in the pumping and/or detection light beams so as to populate the $m_f=-2$ magnetic substate. Therefore it is intended that all matter contained in the above description or shown in the accompanying drawings shall be interpreted as illustrative and not as limiting.

Thus it is apparent that this invention provides a unique and simplified apparatus capable of measuring both angular rotational rates and angular accelerations with a high degree of accuracy and ease of operation.

I claim:

1. An angular rotation measuring device comprising, in combination: a particle containing cavity-defining means adapted to contain magnetic field responsive, optically alignable particles having at least one optically detectable characteristic proportional to angular rotation; optical pumping means coupled to said cavity-defining means and oriented to subject said particles to optical pumping electromagnetic radiation; a first means coupled to said optical pumping means to cyclically terminate said optical pumping electromagnetic radiation; magnetic field generating means coupled to said cavity-defining means and oriented to subject said particles to a unidirectional magnetic field; a second means coupled to said magnetic field generating means to cyclically terminate the magnetic field; optical detection means coupled to said cavity-defining means to detect said optically detectable characteristic of said particles; third means coupled to said optical detection means to cyclically permit detection of said optically detectable characteristic, said first, second and third means being sequentially operable so that said optical pumping means is inoperative when said optical detection means is operative; and signal generating means coupled to said optical detection means to emit a signal proportional to said optically detectable characteristic.

2. A rotation measuring device comprising, in combination: a magnetic field responsive medium having optically alignable magnetic moments; means for producing a first circularly polarized light beam composed of energy in wave lengths at which the magnetic moments are optically alignable for irradiating the medium in a preselected direction to produce transitions between quantum energy states of the medium thereby aligning the magnetic moments of the medium in the preselected direction; means coupled to said first light beam producing means to cyclically terminate the intensity of the first light beam; means coupled to the medium for generating a unidirectional magnetic field for subjecting the medium to the unidirectional magnetic field in the preselected direction; means coupled to the medium for producing a second circularly polarized light beam composed of energy in at least one wave length in the first light beam at which the magnetic moments are optically alignable for irradiating the medium in a direction substantially perpendicular to the preselected direction; and detection means coupled to said second light beam producing means to measure changes in the intensity of the second light beam after the second light beam traverses the medium.

3. A method of measuring angular displacement of a body relative to a first direction along a preselected axis by utilizing the optically alignable magnetic moments of a magnetic field responsive medium, comprising the steps of: irradiating the medium with a beam of optical pumping electromagnetic radiation in a first direction to align the magnetic moments in the first direction; subjecting the medium to a unidirectional magnetic field in the first direction; terminating said irradiation; rotating the body about the preselected axis to orient the magnetic field into a second direction making an angle with the first direction to induce precession of the magnetic moments of the medium about the second direction of the magnetic field; irradiating the medium with a beam of optical detection electromagnetic radiation in a third direction perpendicular to the preselected axis and to the second direction to detect a component of the precessing magnetic moments parallel to the third direction; and measuring changes in the intensity of the optical detection electromagnetic radiation.

4. A method of measuring angular rotation rate of a body about a preselected axis by utilizing the optically alignable magnetic moments of a magnetic field responsive medium, comprising the steps of: irradiating the medium with a beam of optical pumping electromagnetic radiation in a first direction to align the magnetic moments in the first direction; subjecting the medium to a magnetic field in the first direction; terminating said irradiation; rotating the body about the preselected axis to orient the magnetic field into a second direction making an angle with the first direction to induce precession of the magnetic moments of the medium about the second direction of the magnetic field; simultaneously measuring the time interval during which the rotation occurs; irradiating the medium with a beam of optical detection electromagnetic radiation in a third direction perpendicular to the preselected axis and to the second direction to detect a component of the magnetic moments parallel to the third direction and measuring changes in the intensity of the optical detection electromagnetic radiation.

5. A method of measuring an angular rotation rate of a body about a preselected axis by utilizing the optically alignable magnetic moments of a magnetic field responsive medium, comprising the steps of: irradiating the medium with a beam of optical pumping electromagnetic radiation in a first direction to align the magnetic moments in the first direction; subjecting the medium to a magnetic field in the first direction; terminating the irradiation; terminating the magnetic field; rotating the body about the preselected axis; resubjecting the medium to a magnetic field in a second direction making an angle with the first direction proportional to the amount of angular rotation thereby producing precession of the magnetic moments of the medium about the second direction of the magnetic field; measuring the time interval during which the rotation occurs; irradiating the medium with a beam of optical detection electromagentic radiation in a third direction perpendicular to the preselected axis and to the second direction to detect a component of said magnetic moments parallel to the third direction; and measuring changes in the intensity of the optical detection electromagnetic radiation.

6. A method of measuring an angular rotation rate of a body about a preselected axis by utilizing the optically alignable magnetic moments of a magnetic field responsive medium comprising the steps of: irradiating the medium with a beam of optical pumping electromagnetic radiation in a first direction to align the magnetic moments in the first direction; subjecting the medium to a variable intensity unidirectional magnetic field in the first direction; rotating the body about the preselected axis to induce a rotation of the magnetic field and the optical pumping electromagnetic radiation; irradiating the medium with a beam of optical detection electromagnetic radiation in a direction substantially parallel to the preselected axis to detect a component of the magnetic moment parallel to the preselected axis; and measuring changes in the intensity of the optical detection electromagnetic radiation.

7. A method of measuring an angular rotation rate of a body about a preselected axis by utilizing the optically alignable magnetic moments of a magnetic field responsive medium comprising the steps of: irradiating the medium with a beam of optical pumping electromagnetic radiation in a first direction to align the magnetic moments in the first direction; cyclically varying the intensity of the irradiation; subjecting the medium to a magnetic field in the first direction; rotating the body about the preselected axis to induce a rotation of the magnetic field and the optical pumping electromagnetic radiation; irradiating the medium with a beam of optical detection electromagnetic radiation in a direction perpendicular to the preselected axis and the first direction to detect a component of the magnetic moments parallel to the second direction and measuring changes in the intensity of the optical detection electromagnetic radiation.

8. A method of measuring an angular rotation rate of a body about a preselected axis by utilizing the optically alignable magnetic moments of a magnetic field responsive medium comprising the steps of: irradiating the medium with a beam of optical pumping electromagnetic radiation in a first direction to align the magnetic moments in the first direction; cyclically varying the degree of polarization of the optical pumping electromagnetic radiation; subjecting the medium to a magnetic field in the first direction; rotating the body about the preselected axis to cause a rotation of the magnetic field and the optical pumping electromagnetic radiation; irradiating the medium with a beam of optical detection electromagnetic radiation in a direction perpendicular to the first direction and the preselected axis; and measuring changes in the intensity of the optical detection electromagnetic radiation.

9. A method of measuring an angular acceleration of a body about a preselected axis by utilizing the optically alignable magnetic moments of a magnetic field responsive medium comprising the steps of: irradiating the medium with a beam of optical pumping electromagnetic radiation in a first direction to align the magnetic moments in the first direction; subjecting the medium to a variable intensity unidirectional magnetic field in the first direction; applying an angular acceleration to the body about the preselected axis to induce an acceleration of the magnetic field and the optical pumping electromagnetic radiation relative to the first direction, thereby inducing a precession of the magnetic moments about the angularly accelerating magnetic field; irradiating the medium with a beam of optical detection electromagnetic radiation in a direction substantially parallel to the preselected axis to detect a component of the precessing magnetic moments parallel to the preselected axis; and measuring changes in the intensity of the optical detection electromagnetic radiation.

10. The device as defined in claim 2 wherein the magnetic field responsive medium is metastable helium.

11. The device as set forth in claim 2 wherein the magnetic field responsive medium is mercury vapor.

12. The device as set forth in claim 2 wherein the magnetic field responsive medium is thallium vapor.

References Cited by the Examiner

UNITED STATES PATENTS

| | | | |
|---|---|---|---|
| 2,841,760 | 7/58 | Hansen | 324—.5 |
| 3,071,721 | 1/63 | Dehmelt | 324—.5 |

OTHER REFERENCES

Hawkins: Physical Review, vol. 98, No. 2, Apr. 15, 1955, pp. 478–486.

Dehmelt: Physical Review, vol. 105, No. 5, Mar. 1, 1957, pp. 1487–1489 incl.

Dehmelt: "Modulation of a Light Beam by Precessing Absorbing Atoms," Physical Review, vol. 105, No. 6, pp. 1924–1925, Mar. 15, 1957.

Bell et al.: "Optical Detection of Magnetic Resonance in Alkali Metal Vapor," Physical Review, vol. 107, No. 6, pp. 1559–1565, Sept. 15, 1957.

Dehmelt: Physical Review, vol. 109, No. 2, January 1958, pp. 381–384.

Heppner et al.: Journal of Geophysical Research, vol. 63, No. 2, June 1958, pp. 277–288.

Skillman et al.: "Measurement of the Earth's Magnetic Field With a Rubidium Vapor Magnetometer," Journal of Geophysical Research, vol. 63, No. 3, pp. 513–515, September 1958.

Franken et al.: Physical Review Letters, vol. 1, No. 9, November 1958, pp. 316–318.

Holahan: Space Aeronautics, vol. 31, May 1959, pp. 13 to 133.

Franzen: Physical Review, vol. 115, No. 4, Aug. 15, 1959, pp. 850 to 856 incl.

CHESTER L. JUSTUS, *Primary Examiner.*

LLOYD McCOLLUM, MAYNARD R. WILBUR, *Examiners.*